US009736343B2

(12) United States Patent
Tsujikawa et al.

(10) Patent No.: US 9,736,343 B2
(45) Date of Patent: Aug. 15, 2017

(54) IMAGING APPARATUS WITH TOP COVER

(71) Applicant: FUJITSU FRONTECH LIMITED, Tokyo (JP)

(72) Inventors: Akinori Tsujikawa, Inagi (JP); Hiroyuki Tanaka, Inagi (JP)

(73) Assignee: Fujitsu Frontech Limited, Tokyo (JP)

( * ) Notice: Subject to any disclaimer, the term of this patent is extended or adjusted under 35 U.S.C. 154(b) by 0 days.

(21) Appl. No.: 14/922,815

(22) Filed: Oct. 26, 2015

(65) Prior Publication Data

US 2016/0044215 A1 Feb. 11, 2016

Related U.S. Application Data

(63) Continuation of application No. PCT/JP2013/065634, filed on Jun. 5, 2013.

(51) Int. Cl.
*H04N 5/225* (2006.01)
*G06K 9/20* (2006.01)
(Continued)

(52) U.S. Cl.
CPC ......... *H04N 5/2252* (2013.01); *G03B 11/045* (2013.01); *G06K 9/209* (2013.01); *H04N 5/2254* (2013.01); *H04N 5/2256* (2013.01); *G03B 15/03* (2013.01); *G03B 15/14* (2013.01); *G06K 2009/00932* (2013.01)

(58) Field of Classification Search
None
See application file for complete search history.

(56) References Cited

U.S. PATENT DOCUMENTS 5,986,746 A 11/1999 Metz et al.
6,166,832 A 12/2000 Fujimoto
(Continued)

FOREIGN PATENT DOCUMENTS

EP 1 654 984 A2 5/2006
EP 2 009 578 A2 12/2008
(Continued)

OTHER PUBLICATIONS

Notice of Rejection Grounds mailed Mar. 29, 2016, for corresponding Japanese App. No. 2015-521222 (with partial translations).
(Continued)

*Primary Examiner* — Twyler Haskins
*Assistant Examiner* — Wesley Chiu
(74) *Attorney, Agent, or Firm* — Greer Burns & Crain Ltd.

(57) ABSTRACT

An imaging apparatus includes: a wiring board; an imaging unit with an imaging element implemented on the wiring board; a frame-like housing that accommodates the imaging unit and that has an opening formed thereon in an optical axis direction of the imaging unit; a top cover located on the housing; a light source that emits light to be sent to outside via the top cover; a light guide body that guides the light emitted from the light source; and a light blocking body that blocks light around the imaging unit, wherein the imaging unit, the light guide body, and the light blocking body are disposed with a gap between the top cover, and the housing includes a top-cover supporting unit, at least a portion of which supports the top cover at a periphery of the opening.

3 Claims, 11 Drawing Sheets

(51) Int. Cl.
*G03B 11/04* (2006.01)
*G03B 15/03* (2006.01)
*G03B 15/14* (2006.01)
*G06K 9/00* (2006.01)

(56) References Cited

U.S. PATENT DOCUMENTS

| | | | | |
|---|---|---|---|---|
| 2007/0205357 A1* | 9/2007 | Tanaka | ............... | G06K 9/00033 250/227.14 |
| 2007/0206098 A1* | 9/2007 | Matsuo | ............. | G06K 9/00033 348/207.99 |
| 2007/0206114 A1* | 9/2007 | Tanaka | ................... | G03B 15/03 348/371 |
| 2007/0206391 A1* | 9/2007 | Matsuo | ................ | G02B 6/0001 362/558 |
| 2007/0216797 A1* | 9/2007 | Yoshida | ............. | G06K 9/00033 348/370 |
| 2008/0230681 A1* | 9/2008 | Yoshizu | ............. | G06K 9/00033 250/208.1 |
| 2009/0225157 A1* | 9/2009 | Orihara | ................... | G02B 7/02 348/76 |
| 2009/0225405 A1 | 9/2009 | Fujimoto | | |
| 2012/0154672 A1* | 6/2012 | Yamazaki | ............... | G03B 15/02 348/370 |
| 2013/0329031 A1* | 12/2013 | Miura | ................ | G06K 9/00013 348/77 |
| 2014/0160300 A1* | 6/2014 | Hung | ....................... | H04N 5/33 348/164 |
| 2016/0014308 A1* | 1/2016 | Yamazaki | .......... | G06K 9/00033 348/77 |
| 2016/0044214 A1* | 2/2016 | Tsujikawa | ............ | H04N 5/2252 348/77 |

FOREIGN PATENT DOCUMENTS

| | | |
|---|---|---|
| EP | 2 278 529 A1 | 1/2011 |
| JP | 2007-215899 | 8/2007 |
| JP | 2007-229360 | 9/2007 |
| JP | 2007-235942 A | 9/2007 |
| JP | 2007-248872 | 9/2007 |
| JP | 2008-233796 | 10/2008 |
| JP | 2009-210996 | 9/2009 |
| WO | WO97/23991 | 7/1997 |
| WO | WO 2011/052018 A1 | 5/2011 |

OTHER PUBLICATIONS

Int'l. Search Report issued in Int'l. App. No. PCT/JP2013/065634, mailed Sep. 10, 2013.
Written opinion of the ISA; issued Sep. 10, 2013 (with partial translation).
Extended EP Search Report issued in corresponding EP App. No. 13886347.7, dated Oct. 20, 2016.

* cited by examiner

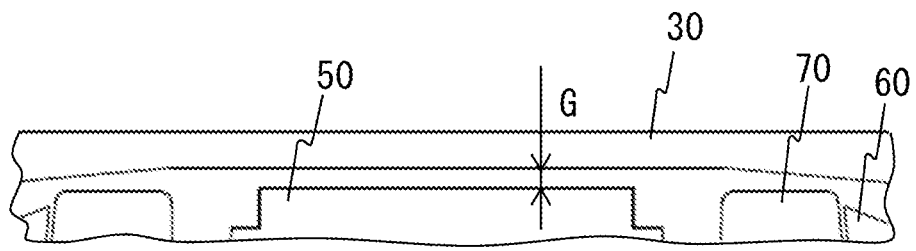
F I G. 3

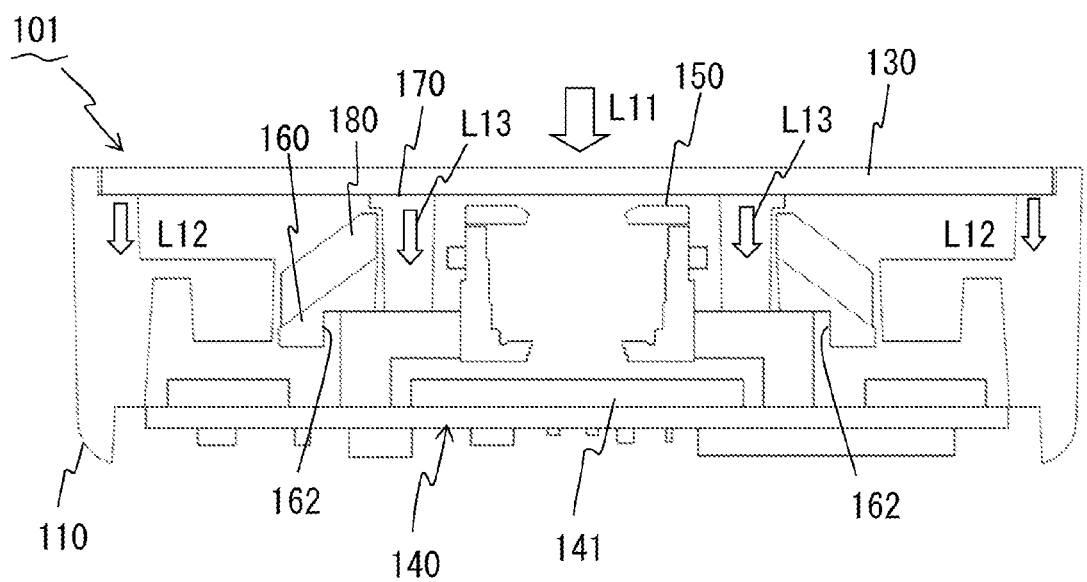
F I G. 7

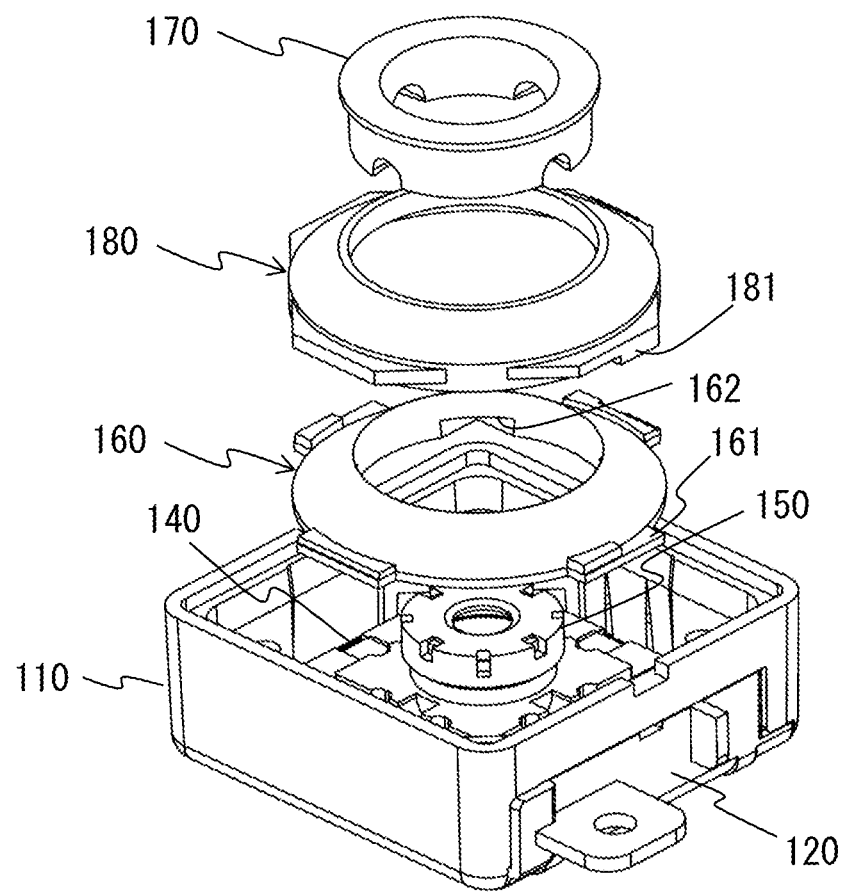
F I G. 9

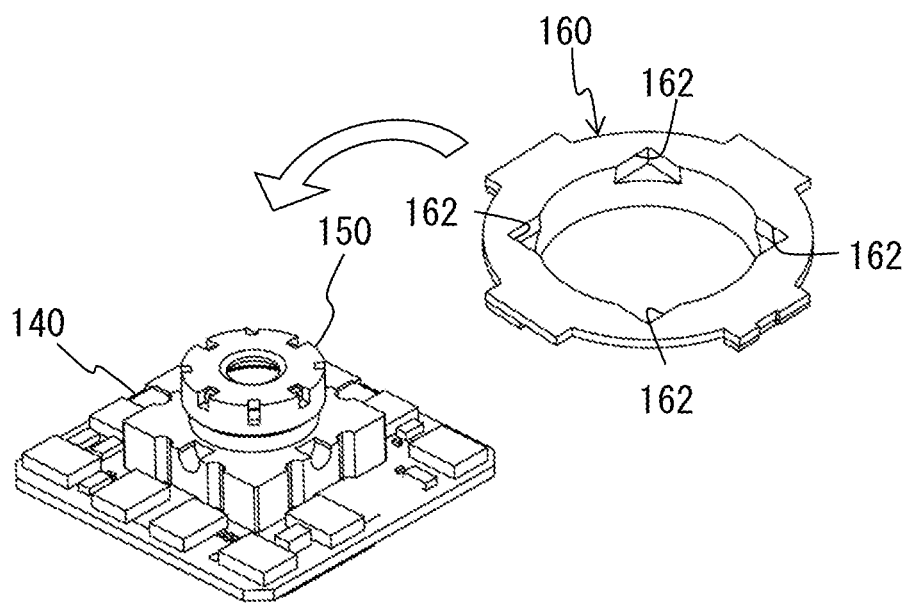
F I G. 1 0

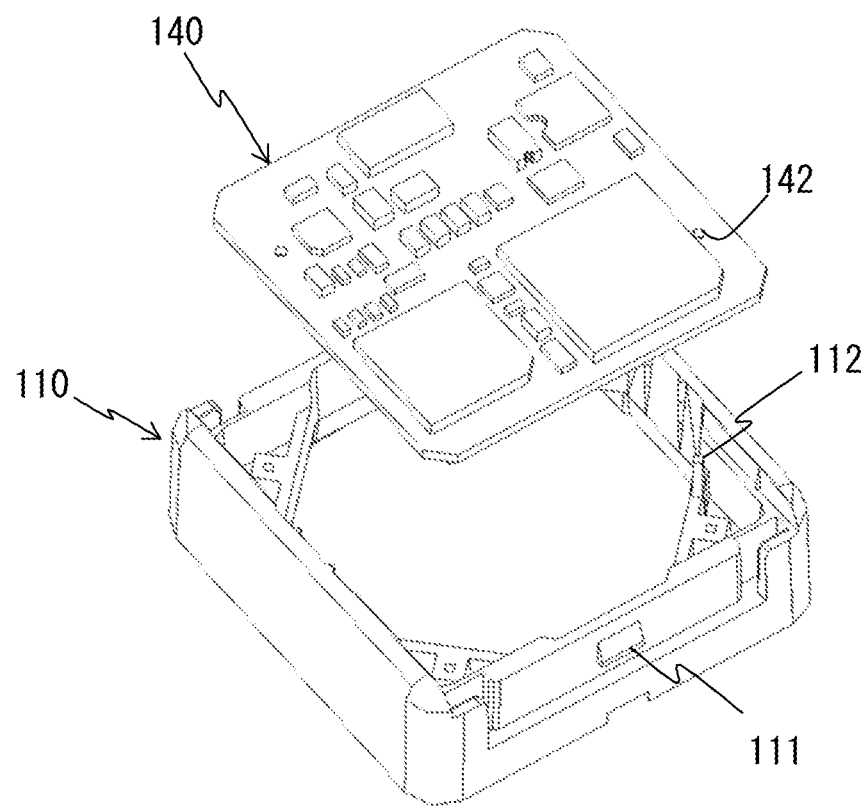
F I G. 1 1

IMAGING APPARATUS WITH TOP COVER

CROSS-REFERENCE TO RELATED APPLICATION

This application is a continuation application of International Application PCT/JP2013/065634 filed on Jun. 5, 2013 and designated the U.S., the entire contents of which are incorporated herein by reference.

FIELD OF THE INVENTION

The embodiments discussed herein are related to an imaging apparatus that includes a top cover located on a housing.

BACKGROUND OF THE INVENTION

Conventionally, biometric authentication apparatuses have been known that perform authentication by picking up an image of biometric information such as palm veins.

As one of such biometric authentication apparatuses, a personal authentication apparatus that performs authentication using finger veins is known wherein a light guide conduit for guiding light emitted from a near infrared LED is molded around a filter integrally with the filter and a cover (see, for example, Japanese Laid-open Patent Publication No. 2007-215899).

An apparatus with a light guide conduit located around a filter, as described above, has a complicated structure, and it takes a long time to assemble the apparatus.

An imaging apparatus that picks up an image of palm veins is also known wherein a light guide body guides light to outside via a visible light filter. According to the imaging apparatus, a light blocking hood provided around an optical unit abuts the visible light filter. (See, for example, Japanese Laid-open Patent Publication No. 2007-229360.)

In regard to a technology related to a lens unit, a lens unit is known that is provided with three connecting members for achieving rotational symmetries through 120 degrees (threefold symmetry) with respect to a lens optical axis. (See, for example, Japanese Laid-open Patent Publication No. 2007-248872.)

BRIEF SUMMARY OF THE INVENTION

A disclosed imaging apparatus includes: a wiring board; an imaging unit with an imaging element implemented on the wiring board; a frame-like housing that accommodates the imaging unit and that has an opening formed thereon in an optical axis direction of the imaging unit; a top cover located on the housing; a light source that emits light to be sent to outside via the top cover; a light guide body that guides the light emitted from the light source; and a light blocking body that blocks light around the imaging unit, wherein the imaging unit, the light guide body, and the light blocking body are disposed with a gap between the top cover, and the housing includes a top-cover supporting unit, at least a portion of which supports the top cover at the periphery of the opening.

BRIEF DESCRIPTION OF THE SEVERAL VIEWS OF THE DRAWING

FIG. 3 is an enlarged view of a portion indicated as B in FIG. 2;

FIG. 7 is a cross-sectional view illustrating an imaging apparatus in accordance with a reference art;

FIG. 9 is a top-side exploded perspective view illustrating a portion of an imaging apparatus in accordance with a reference art;

FIG. 10 is an explanatory diagram for a method of mounting a light guide body in accordance with a reference art; and FIG. 11 is a bottom-side exploded perspective view illustrating a portion of an imaging apparatus in accordance with a reference art.

DETAILED DESCRIPTION OF THE INVENTION

FIG. 7 is a cross-sectional view illustrating an imaging apparatus 101 in accordance with a reference art.

Figure 8:
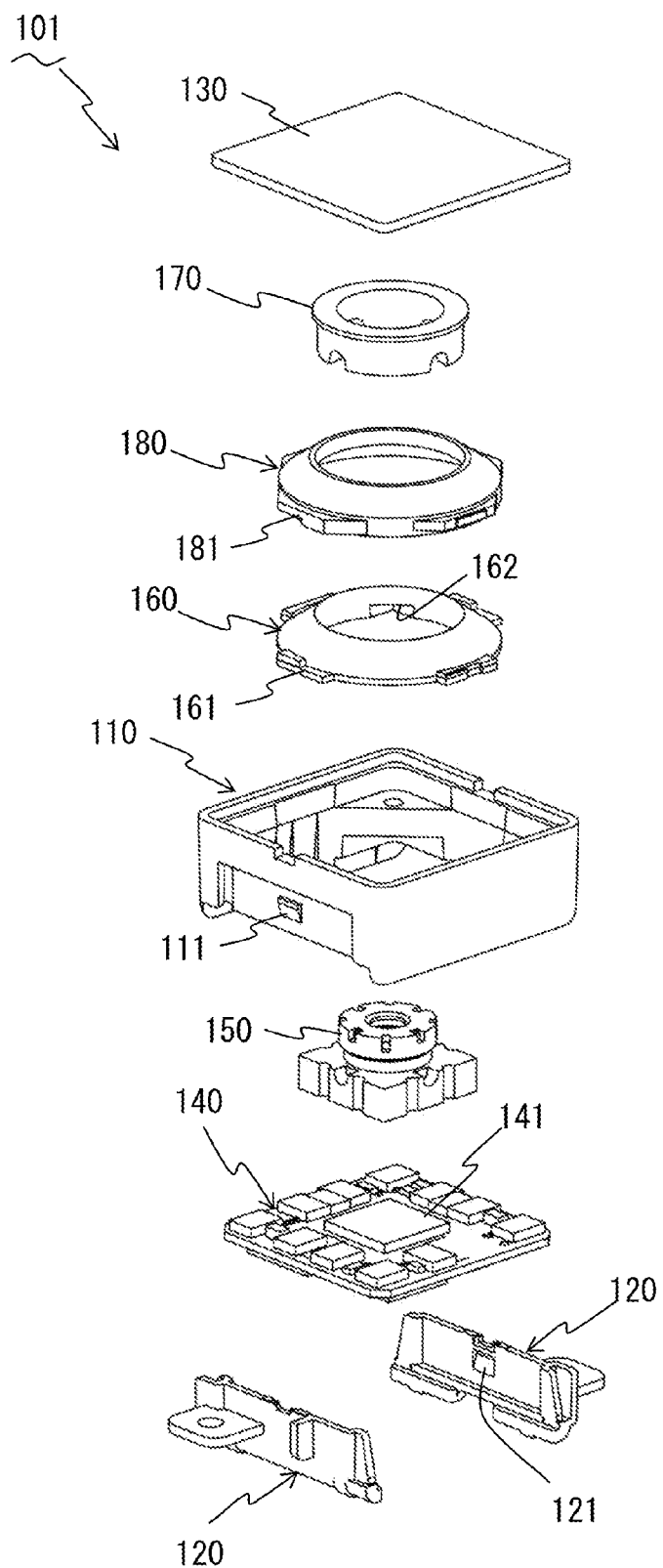
FIG. 8 is a top-side exploded perspective view illustrating an imaging apparatus in accordance with a reference art.

FIG. 8 is a top-side exploded perspective view illustrating an imaging apparatus 101 in accordance with a reference art.

FIG. 9 is a top-side exploded perspective view illustrating a portion of an imaging apparatus 101 in accordance with a reference art.

FIG. 10 is an explanatory diagram for a method of mounting a light guide body 160 in accordance with a reference art.

As illustrated in FIGS. 7 and 8, the imaging apparatus 101 includes a housing 110, stoppers 120, a top cover 130, a wiring board 140, a lens module 150, a light guide body 160, a light blocking body 170, and a diffusing body 180. The imaging apparatus 101 is, for example, a biometric authentication apparatus that picks up an image of biometric information such as palm veins.

The housing 110 is shaped like a square frame when viewed in a plane. The top cover 130 is located at an upper portion of the housing 110. The housing 110 accommodates an imaging unit. The imaging unit includes an imaging element 141 implemented on the wiring board 140, and a lens module 150.

The stopper 120 sandwiches the wiring board 140 in cooperation with the housing 110 so as to fix the wiring board 140 to the housing 110. Inserting a housing lug 111 of the housing 110 into a housing-lug-mated recess 121 of the stopper 120 causes the housing 110 to engage with the stopper 120.

The stoppers 120 are located on two opposing surfaces of the four outer surfaces of the housing 110. The stoppers 120 are inserted from the bottom-surface side of the housing 110.

The light guide body 160 guides light toward the diffusing body 180.

The light blocking body 170 blocks light around the lens module 150.

The diffusing body 180 diffuses light guided by the light guide body 160 toward the top cover 130.

The light guide body 160, the light blocking body 170, and the diffusing body 180 all have a circular shape.

As illustrated in FIG. 9, the stoppers 120, the wiring board 140, and the lens module 150 are placed in the housing 110 from below, and then the light guide body 160, the diffusing body 180, and the light blocking body 170 are placed in the housing 110 from above.

In another example, after the light guide body 160, the diffusing body 180, and the light blocking body 170 are placed over the wiring board 140 and the lens module 150, all of these elements may be placed in the housing 110 from below.

However, as depicted in, for example, FIG. 11, inserting a positioning pin 112 of the housing 110 into a positioning bore 142 positions the wiring board 140 relative to the housing 110. Accordingly, under a condition in which the light guide body 160, the diffusing body 180, and the light blocking body 170 are located over the wiring board 140 and the lens module 150, the light guide body 160, the diffusing body 180, and the light blocking body 170 could possibly touch the housing 110 while positioning the wiring board 140 and the housing 110, and it might be difficult to position the wiring board 140 and the housing 110. Hence, as described above, the stoppers 120, the wiring board 140, and the lens module 150 are placed in the housing 110 from below, and then the light guide body 160, the diffusing body 180, and the light blocking body 170 are placed in the housing 110 from above.

As depicted in FIG. 10, the light guide body 160 is located over upper portions of the wiring board 140 and lens module 150 in a manner such that four corners of the lens module 150 are inserted into four recesses 162 formed on a bottom surface of the light guide body 160. In this case, although not illustrated in FIG. 10, the wiring board 140 and the lens module 150 are positioned with respect to the housing 110.

Next, as depicted in FIG. 9, a positioning unit 161 provided on an outer surface of the light guide body 160 is positioned relative to a positioning unit 181 provided on an outer surface of the diffusing body 180. The positioning units 161 and 181 engage with each other at only one point, and hence the orientation of the diffusing body 180 needs to completely match the orientation of the light guide body 160.

Subsequently, as depicted in FIG. 7, the light blocking body 170 is located over the lens module 150 inside of the light guide body 160 and the diffusing body 180.

The light blocking body 170 is in contact with the top cover 130. Accordingly, as depicted in FIG. 7, a load L11 on the top cover 130 is applied to the housing 110 at the periphery of the top cover 130 (load L12) and to the light blocking body 170 (load L13).

Application of the load L13 to the light blocking body 170 leads to a load being directly applied to the wiring board 140 via the lens module 150. Minute components, such as CPUs and/or memories, are implemented on the wiring board 140, and hence application of a load to the wiring board 140 could damage a component implemented thereon.

The following describe an imaging apparatus 1 in accordance with embodiments with reference to the drawings.

Figure 1:
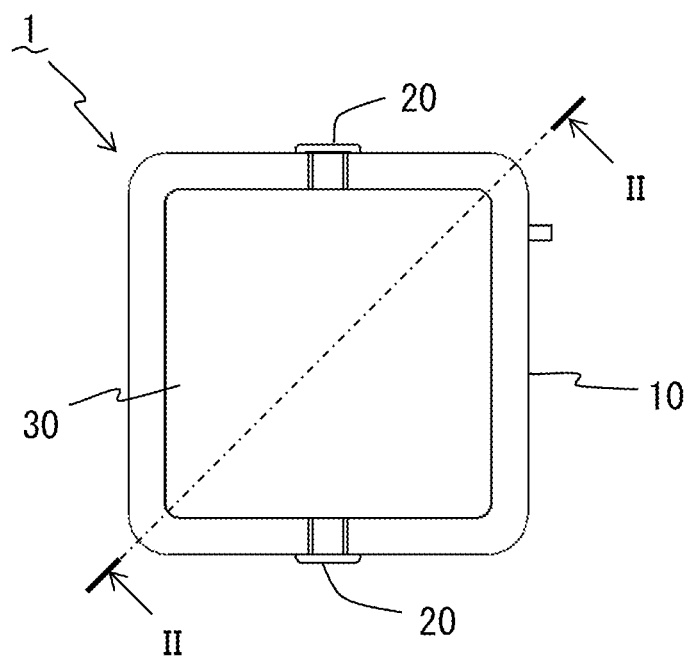
FIG. 1 is a plane view illustrating an imaging apparatus in accordance with an embodiment.

FIG. 1 is a plane view illustrating an imaging apparatus 1 in accordance with an embodiment.

Figure 2:
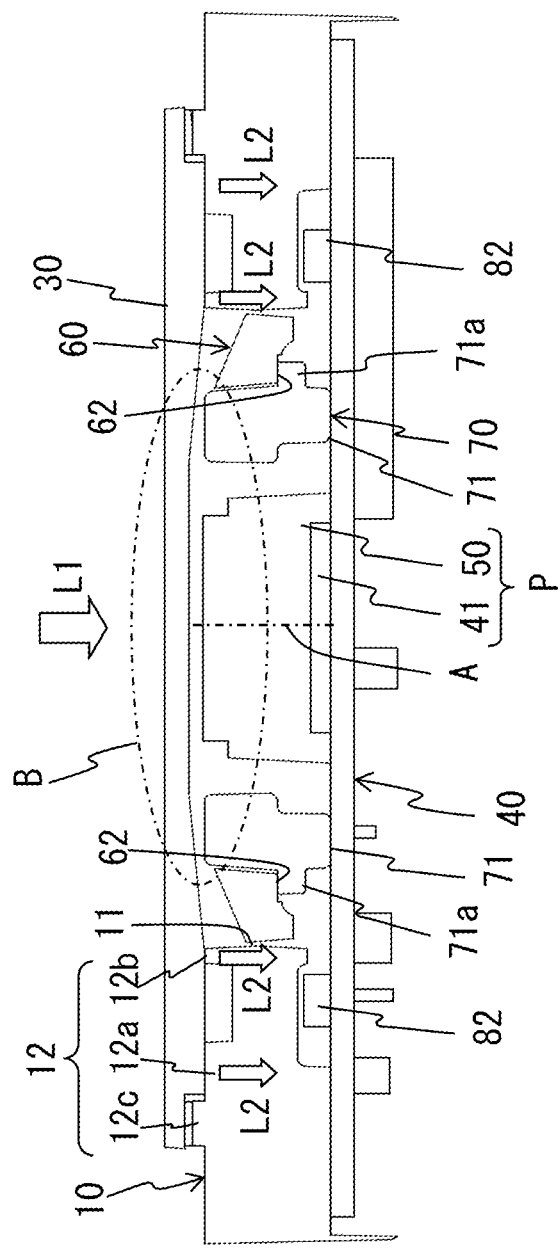
FIG. 2 is a cross-sectional view taken on line II-II of FIG. 1.

FIG. 2 is a cross-sectional view taken on line II-II of FIG. 1.

FIG. 3 is an enlarged view of a portion indicated as B in FIG. 2.

Figure 4:
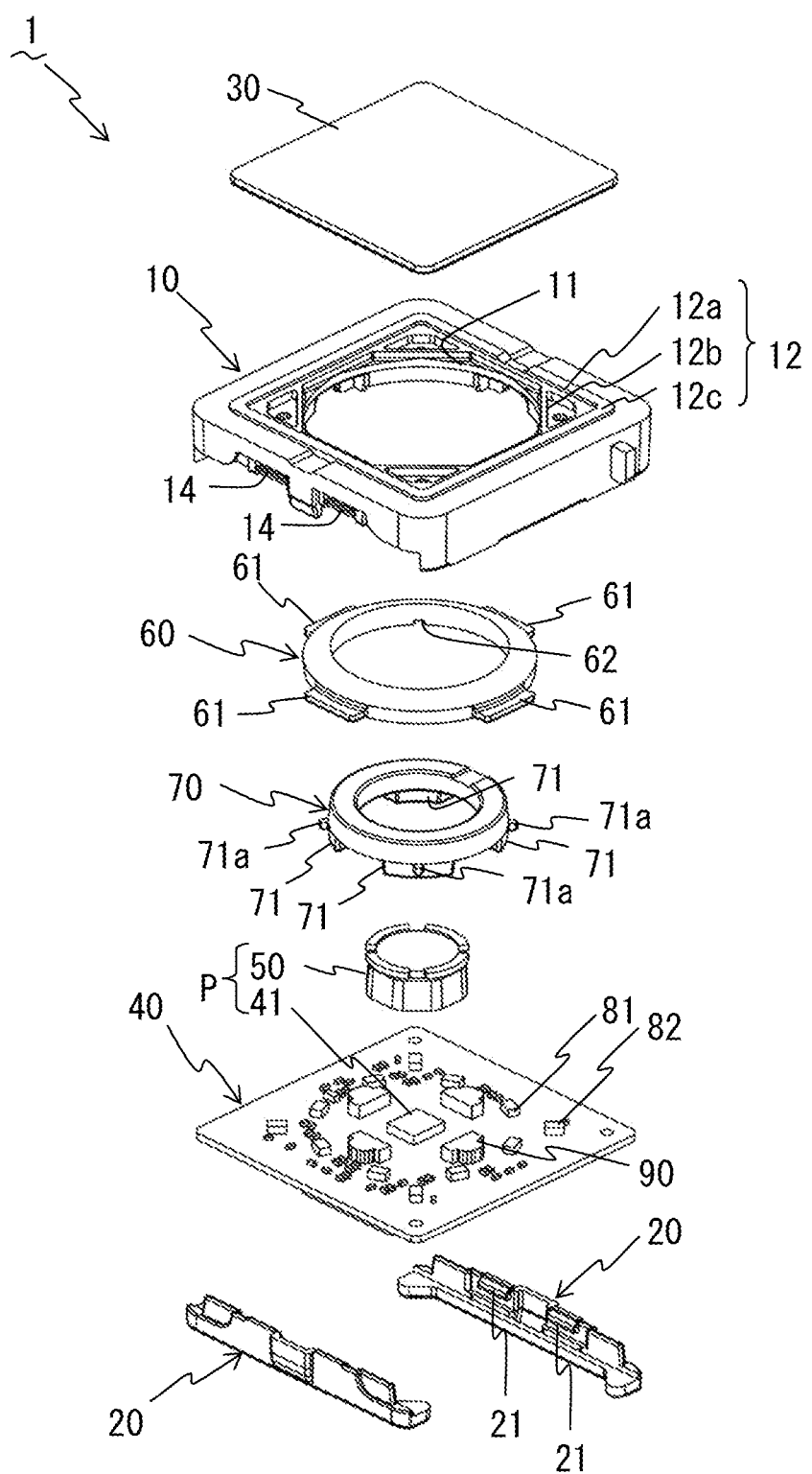
FIG. 4 is a top-side exploded perspective view illustrating an imaging apparatus in accordance with an embodiment.

FIG. 4 is a top-side exploded perspective view illustrating an imaging apparatus 1 in accordance with an embodiment.

Figure 5:
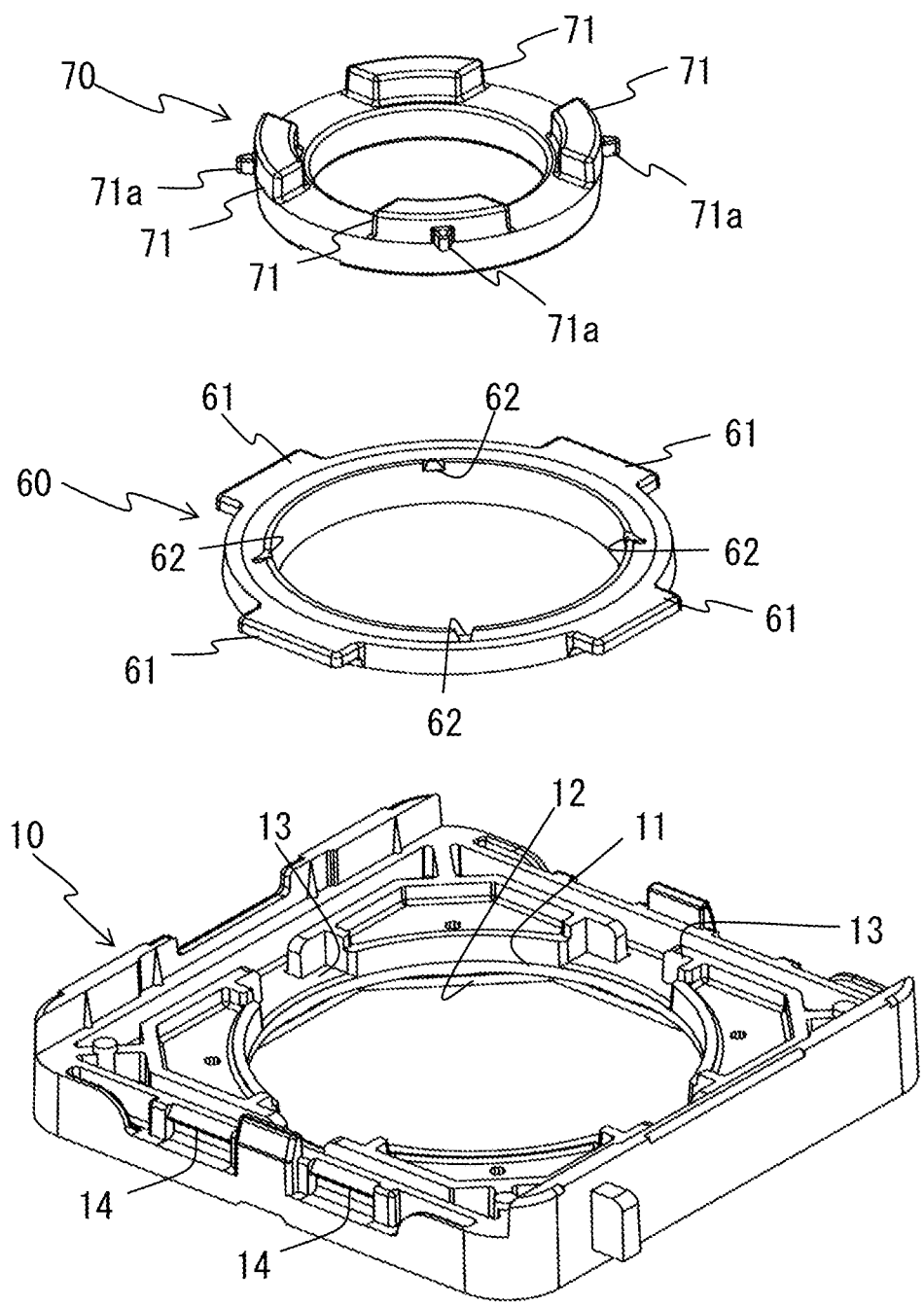
FIG. 5 is a bottom-side exploded perspective view illustrating a portion of an imaging apparatus in accordance with an embodiment.

FIG. 5 is a bottom-side exploded perspective view illustrating a portion of an imaging apparatus 1 in accordance with an embodiment.

Figure 6:
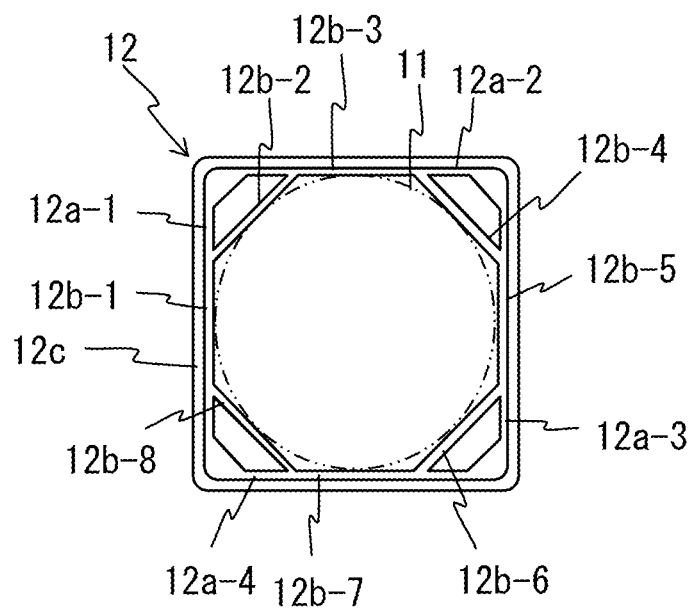
FIG. 6 is a schematic plane view illustrating a top-cover supporting unit in accordance with an embodiment.

FIG. 6 is a schematic plane view illustrating a top-cover supporting unit 12 in accordance with an embodiment.

As depicted in FIG. 4, the imaging apparatus 1 includes a housing 10, stoppers 20, a top cover 30, a wiring board 40, a lens module 50, a light guide body 60, a light blocking body 70, an illumination light-emitting element 81, a distance-measuring light-emitting element 82, and a photodetector 90.

The imaging apparatus 1 may be used as, for example, a biometric authentication apparatus that picks up an image of biometric information such as palm veins or a biometric-authentication-oriented imaging apparatus that functions as a portion of the biometric authentication apparatus.

The housing 10 includes an opening 11, a top-cover supporting unit 12, a light-guide-body supporting unit 13 (see FIG. 5), and a stopper-lug-mated recess 14. The housing 10 accommodates an imaging unit P. The imaging unit P includes a lens module 50 and an imaging element 41, and this will be described in detail hereinafter. The housing 10 is shaped like a frame. For example, the housing 10 may be shaped like a square frame when viewed in a plane.

The opening 11 is formed in an optical-axis-A direction of the imaging unit P depicted in FIG. 2. For example, the opening 11 may be circular and formed at a center of the housing 10 when viewed in a plane.

At least a portion of the top-cover supporting unit 12 supports the top cover 30 at the periphery of the opening 11. The top-cover supporting unit 12 is, for example, a portion of the top surface of the housing 10 that supports the top cover 30. Hence, a top-cover supporting unit 12 is provided integrally with the housing 10. However, the top-cover supporting unit 12 may be located at the housing 10 as an independent member.

As depicted in FIGS. 2, 4, and 6, the top-cover supporting unit 12 includes a rectangular part 12*a*, an octangle part 12*b*, and a projecting part 12*c*.

The rectangular part 12*a* is adjacent to the inside of the projecting part 12*c*, which is rectangular. For example, the projecting part 12*c* may project upward from the top surface of the housing 10 and support the periphery of the top cover 30.

The octangle part 12*b* is formed of eight sides 12*b*-1, 12*b*-2, . . . , 12*b*-8 depicted in FIG. 6. The octangle part 12*b* is inscribed in the rectangular part 12*a*. However, four sides 12*b*-1, 12*b*-3, 12*b*-5, and 12*b*-7 of the octangle part 12*b* are identical with central portions of four sides 12*a*-1, 12*a*-2, 12*a*-3, and 12*a*-4 of the rectangular part 12*a*.

The octangle part 12*b* assumes a shape of an equilateral octagon circumscribing the opening 11, as indicated by a phantom line (two-dot dash line) in FIG. 6. This means that the central portion of each of the eight sides of the octangle part 12*b* supports the top cover 30 at the periphery of the opening 11. As long as at least a portion of the top-cover supporting unit 12 supports the top cover 30 at the periphery of the opening 11, the shape of the top-cover supporting unit is not limited. As illustrated in FIG. 5, the light-guide-body supporting unit 13 is located on a surface of the housing 10 opposite to the surface on which the top cover 30 is located (e.g., the light-guide-body supporting unit 13 is located on the bottom-surface side), and supports a positioning unit 61 of the light guide body 60. A plurality of light-guide-body supporting units 13 are located at positions with rotational symmetries whose rotational center is an optical axis A. For example, the light-guide-body supporting units 13 may each be a recess formed on the bottom-surface side and inside of the housing 10 (optical-axis-A side); four light-guide-body supporting units 13 may be located at equal intervals, i.e., at intervals of 90 degrees, along the periphery of the opening 11.

A stopper lug 21 of the stopper 20 is inserted into the stopper-lug-mated recess 14. For example, two stopper-lug-mated recesses 14 are formed on each of the two surfaces of the housing 10 on which the stopper 20 is located, i.e., each of two opposing surfaces from among the four outer surfaces of the housing 10.

As illustrated in FIG. 4, the two stoppers 20 each include two stopper lugs 21 to be inserted into the stopper-lug-mated recesses 14. The stoppers 20 sandwich the wiring board 40 in cooperation with the housing 10 so as to fix the wiring board 40 to the housing 10. Two stoppers 20 are desirably located opposite to each other.

The top cover 30 is supported by the top-cover supporting unit 12 of the housing 10. The top cover 30 assumes, for example, a shape of a square. The top cover 30 is formed of a translucent material such that irradiation light emitted toward a target object (e.g., a palm vein) and reflected light from the target object can pass through the top cover 30.

The wiring board 40 is located on the bottom-surface side of the imaging apparatus 1. Components such as CPUs and/or memories are implemented on the wiring board 40 so that the wiring board 40 can function as a controlling unit for picking up an image. When the imaging apparatus 1 is used as a biometric authentication apparatus, the wiring board 40 may function as a controlling unit for biometric authentication.

The imaging unit P includes the lens module 50 and the imaging element 41 implemented on the wiring board 40. The imaging unit P is accumulated in the housing 10.

The light guide body 60 guides light emitted from the illumination light-emitting element 81, which will be described hereinafter. For example, the light guide body 60 may be circular and guide light emitted from the illumination light-emitting element 81 to a target object via the top cover 30. In the present embodiment, the housing 10 does not include a diffusing body (see the diffusing body 180 depicted in FIGS. 7-9), and hence it is desirable that the light guide body 60 diffuse light or that the illumination light-emitting element 81 emit diffused light.

The light guide body 60 includes a plurality of positioning units 61 and a plurality of light-blocking-body supporting units 62.

As depicted in FIG. 5, the plurality of positioning units 61 are located at positions with rotational symmetries whose rotational center is the optical axis A illustrated in FIG. 2, and are each positioned at any of the plurality of light-guide-body supporting units 13. For example, four positioning units 61 may be located along the circumference of the light guide body 60 at intervals of 90 degrees in such a manner as to project outward.

The light-blocking-body supporting unit 62 is located on a surface opposite to the surface on which the top cover 30 is located (e.g., the light-blocking-body supporting unit 62 is located on the bottom-surface side), and supports the light blocking body 70. A plurality of light-blocking-body supporting units 62 are located at positions with rotational symmetries whose rotational center is the optical axis A. For example, the light-blocking-body supporting units 62 may each be a recess formed on the bottom-surface side and inside of the light guide body 60 (optical-axis-A side); four light-blocking-body supporting units 62 may be located at intervals of 90 degrees along the circumference of the light guide body 60.

The light blocking body 70 blocks light around the imaging unit P. For example, the light blocking body 70 may be located between the lens module 50 and the light guide body 60 and may block and prevent light from being incident on the lens module 50 from the outer surface.

The light blocking body 70 includes a plurality of positioning units 71a. For example, the positioning unit 71a may be provided on a leg 71 formed at the light blocking body 70 in such a manner as to project outward from the leg 71. As depicted in FIG. 2, the leg 71 abuts the wiring board 40.

As depicted in FIG. 5, the positioning units 71a are located at positions with rotational symmetries whose rotational center is the optical axis A, and are each positioned at any of the plurality of light-blocking-body supporting units 62. For example, four positioning units 71a may be located along the circumference of the light blocking body 70 at intervals of 90 degrees.

As described in FIGS. 2 and 3, the lens module 50, the light guide body 60, and the light blocking body 70 are disposed with a gap between the top cover 30. Accordingly, the top cover 30 is in a noncontact state in the opening 11. A gap G between the lens module 50 and the top cover 30 in FIG. 3 is, for example, about 0.16 mm. In the present embodiment, the gap G is determined such that the lens module 50, the light guide body 60, and the light blocking body 70 do not come in contact with the top cover 30 even when a force of about 10N is applied.

The illumination light-emitting element 81 depicted in FIG. 4 emits light to be sent to outside via the top cover 30. The illumination light-emitting element 81 is an exemplary light source. A plurality of illumination light-emitting elements 81 are implemented on the wiring board 40, and the illumination light-emitting elements 81 are, for example, LEDs. As described above, light from the illumination light-emitting elements 81 is emitted to a target object via the light guide body 60 and the top cover 30.

The distance-measuring light-emitting element 82 is a light emitting element to be used to measure a distance. A plurality of distance-measuring light-emitting elements 82 are implemented on the wiring board 40 outside of the illumination light-emitting elements 81, and the distance-measuring light-emitting elements 82 are, for example, LEDs.

Photodetectors 90, e.g., four photodetectors 90, are implemented on the wiring board 40 around the lens module 50. For example, the photodetector 90 is positioned to control the light quantity of the illumination light-emitting element 81.

In the imaging apparatus 1 described above, at least a portion of the top-cover supporting unit 12 (the center of each of the sides 12b-1, 12b-2, . . . , 12b-8 of the octangle part 12b depicted in FIG. 6) supports the top cover 30 at the periphery of the opening 11 of the housing 10. The lens module 50, the light guide body 60, and the light blocking body 70 are disposed with a gap between the top cover 30.

Hence, as depicted in FIG. 2, the load L1 applied to the top cover 30 is applied to the housing 10 at the top-cover supporting unit 12 at the periphery of the opening 11 (load L2). The load L1 is also applied to the housing 10 at the top-cover supporting unit 12 at a portion that is not the periphery of the opening 11 (corresponding to the periphery of the top cover 30 in FIG. 2) (load L2).

This allows a load from the top cover 30 to be prevented from being directly applied to the wiring board 40 via the lens module 50, the light guide body 60, and the light blocking body 70. A portion of the load L2 could be applied to the wiring board 40 via the light-guide-body supporting unit 13, the light guide body 60, and the light blocking body 70, but such a portion is tiny.

In the embodiment described above, the imaging unit P, the light guide body 60, and the light blocking body 70 are disposed with a gap between the top cover 30. At least a portion of the top-cover supporting unit 12 supports the top cover 30 at the periphery of the opening 11.

Hence, the load L1 applied to the top cover 30 will be applied to the housing 10 at the top-cover supporting unit 12 at the periphery of the opening 11 (load L2). This allows a load from the top cover 30 to be prevented from being directly applied to the wiring board 40 via the lens module 50, the light guide body 60, and the light blocking body 70, as described above. Thus, a risk of damaging minute components implemented on the wiring board 40, such as CPUs and/or memories, may be suppressed without the need for a complicated configuration.

Accordingly, the present embodiment may improve the durability of the imaging apparatus 1 using a simple configuration.

In the present embodiment, the light-guide-body supporting unit 13 of the housing 10 is located on a surface of the housing 10 opposite to the surface on which the top cover 30 is located (e.g., the light-guide-body supporting unit 13 is located on the bottom-surface side), and supports the light guide body 60. The light-blocking-body supporting unit 62 of the light guide body 60 is located on a surface of the light guide body 60 opposite to the surface on which the top cover 30 is located (e.g., the light-blocking-body supporting unit 62 is located on the bottom-surface side), and supports the light blocking body 70.

Hence, not only the wiring board 40 and the lens module 50 but also the light guide body 60 and the light blocking body 70 may be disposed from the bottom-surface side of the housing 10. This improves the workability of the assembling of the imaging apparatus 1. A simpler configuration can also be achieved.

In the present embodiment, a plurality of light-guide-body supporting units 13 and a plurality of light-blocking-body supporting units 62 are located at positions with rotational symmetries. The plurality of positioning units 61 of the light guide body 60 are located at positions with rotational symmetries and supported while each is positioned at any of the plurality of light-guide-body supporting units 13. The plurality of positioning units 71a of the light blocking body 70 are located at positions with rotational symmetries and supported while each is positioned at any of the plurality of light-blocking-body supporting units 62.

Accordingly, a task for aligning the orientations of the light guide body 60 and light blocking body 70 is simplified so that the light guide body 60 and the light blocking body 70 can be readily positioned with respect to the housing 10. This can further improve the workability of the assembling of the imaging apparatus 1.

What is claimed is:

1. An imaging apparatus comprising:
a wiring board;
an imaging unit that includes a lens module and an imaging element implemented on the wiring board;
a frame-like housing that accommodates the imaging unit and that has an opening formed thereon in an optical axis direction of the imaging unit;
a top cover located on the housing;
a light source that emits light to be sent to outside via the top cover;
a light guide body that guides the light emitted from the light source; and
a light blocking body that blocks light around the imaging unit, wherein
the imaging unit, the light guide body, and the light blocking body are disposed with a gap between the top cover,
the housing includes a top-cover supporting unit, at least a portion of which supports the top cover at a periphery of the opening, and a light-guide-body supporting unit that is located on a surface opposite to a surface on which the top cover is located and that supports the light guide body, and
the light guide body includes a light-blocking-body supporting unit that is located on a surface opposite to the surface on which the top cover is located and that supports the light blocking body.

2. The imaging apparatus according to claim 1, wherein
a plurality of light-guide-body supporting units and a plurality of light-blocking-body supporting units are located at positions with rotational symmetries,
the light guide body includes a plurality of positioning units located at positions with rotational symmetries and each positioned at any of the plurality of light-guide-body supporting units, and
the light blocking body includes a plurality of positioning units located at positions with rotational symmetries and each positioned at any of the plurality of light-blocking-body supporting units.

3. The imaging apparatus according to claim 1, wherein
the light-guide-body supporting units is a recess formed on the surface of the housing opposite to the surface on which the top cover is located and on the optical axis side, and
the light-blocking-body supporting unit is a recess formed on the surface of the light guide body opposite to the surface on which the top cover is located and on the optical axis side.

* * * * *